United States Patent
Blümel et al.

(10) Patent No.: US 7,842,131 B2
(45) Date of Patent: Nov. 30, 2010

(54) HIGH OPACITY TIO$_2$ PIGMENT AND PRODUCTION METHOD

(75) Inventors: Siegfried Blümel, Ratigen (DE); Lydia Drews-Nicolai, Köln (DE); Volker Jürgens, Kirchhundem (DE); Volker Schmitt, Leichlingen (DE)

(73) Assignee: Kronos International Inc, Leverkusen (DE)

( * ) Notice: Subject to any disclaimer, the term of this patent is extended or adjusted under 35 U.S.C. 154(b) by 501 days.

(21) Appl. No.: 11/668,629

(22) Filed: Jan. 30, 2007

(65) Prior Publication Data

US 2007/0175363 A1    Aug. 2, 2007

Related U.S. Application Data

(60) Provisional application No. 60/772,918, filed on Feb. 13, 2006.

(30) Foreign Application Priority Data

Jan. 30, 2006    (DE) .................. 10 2006 004 344

(51) Int. Cl.
  *C09C 1/36*    (2006.01)
  *D06N 7/04*    (2006.01)
  *E01F 9/04*    (2006.01)
  *E04D 7/00*    (2006.01)

(52) U.S. Cl. ................. 106/436; 106/442; 106/443; 106/446; 428/143; 428/144; 428/145; 428/403

(58) Field of Classification Search ................. 106/436, 106/442, 443, 446; 428/403, 143–145
See application file for complete search history.

(56) References Cited

U.S. PATENT DOCUMENTS

| | | | |
|---|---|---|---|
| 3,330,798 A * | 7/1967 | Hund et al. ................. 523/200 |
| 3,513,007 A | 5/1970 | Lederer | |
| 3,513,008 A * | 5/1970 | Lawrence .................. 106/438 |
| 3,515,566 A * | 6/1970 | Moody et al. ............... 106/438 |
| 3,522,078 A | 7/1970 | May et al. | |
| 3,767,455 A | 10/1973 | Claridge et al. | |
| 4,759,800 A | 7/1988 | Luginsland et al. | |
| 5,165,995 A * | 11/1992 | Losoi ........................ 428/403 |
| 5,665,466 A | 9/1997 | Guez et al. | |
| 5,705,033 A | 1/1998 | Gerard et al. | |
| 5,942,281 A | 8/1999 | Guez et al. | |
| 5,976,237 A * | 11/1999 | Halko et al. ................ 106/443 |
| 6,200,375 B1 | 3/2001 | Guez et al. | |
| 6,340,387 B1 * | 1/2002 | Orth-Gerber et al. ....... 106/447 |
| 6,576,052 B1 * | 6/2003 | Takahashi et al. .......... 106/443 |
| 7,147,702 B2 * | 12/2006 | Drews-Nicolai et al. .... 106/443 |
| 7,166,157 B2 * | 1/2007 | Drews-Nicolai et al. .... 106/447 |
| 7,264,672 B1 * | 9/2007 | Trabzuni et al. ............ 106/443 |
| 7,288,146 B1 * | 10/2007 | Nicolai et al. .............. 106/443 |
| 2006/0078458 A1 | 4/2006 | Strobl et al. | |

* cited by examiner

*Primary Examiner*—Patricia L Hailey
(74) *Attorney, Agent, or Firm*—Rodney T Hodgson

(57) ABSTRACT

The invention relates to a rutile titanium dioxide pigment for use in decorative laminating papers that yields higher opacity of the papers compared to the prior art, as well as a method for its manufacture. The pigment displays a surface coating that contains aluminum phosphate, aluminum oxide, silicon oxide and titanium oxide. The silicon oxide is precipitated in fluffy form. The coated particles display a BET value of at least 15 m$^2$/g.

The manufacturing method is characterized in that an aluminum and a phosphorus component are first added to a TiO$_2$ suspension. Thereafter, an alkaline silicon component, an acid-reacting titanium component and, optionally, a further pH-regulating component are added, the pH value being set in the range from 4 to 9 in this context.

31 Claims, No Drawings

HIGH OPACITY TIO₂ PIGMENT AND PRODUCTION METHOD

CROSS REFERENCE TO RELATED APPLICATIONS

This application claims priority pursuant to 35 U.S.C. 119 (e) of U.S. Provisional Application No. 60/772,918 filed Feb. 13, 2006 and to German application DE 10 2006 004 344.8 filed 30 Jan. 2006.

FIELD OF THE INVENTION

The invention relates to a titanium dioxide pigment of high opacity, a method for its manufacture and its use in decorative laminating papers or decorative foils.

TECHNOLOGICAL BACKGROUND OF THE INVENTION

Decorative laminating papers and decorative foils are part of a decorative, thermosetting coating material, used with preference for finishing furniture surfaces, for laminate flooring and in interior finishing. Laminates is the term used to denote materials in which, for example, several impregnated, stacked layers of paper, or paper and hardboard or fibreboard, are pressed together. The use of special synthetic resins achieves extraordinarily high resistance of the laminates to marring, impact, chemicals and heat.

The use of decorative laminating papers (which is always also intended to mean decorative foils below) makes it possible to produce decorative surfaces, where the decorative laminating paper serves not only as facing paper, e.g. to hide unattractive wood material surfaces, but also as a carrier for the synthetic resin.

The demands imposed on decorative laminating paper include, among others, opacity (hiding power), light-fastness (greying resistance), colour-fastness, wet strength, suitability for impregnation and printability.

The economic efficiency of the manufacturing process for decorative laminating papers is determined by, among other things, the opacity of the pigment in the paper. In principle, a pigment based on titanium dioxide is eminently suitable for achieving the necessary opacity of the decorative laminating paper. During paper manufacture, a titanium dioxide pigment, or a titanium dioxide pigment suspension, is usually mixed with a pulp suspension. In addition to pigment and pulp as the feedstock, use is generally also made of auxiliaries, such as wet-strength agents, and further additives where appropriate. The interactions of the individual components (pulp, pigment, auxiliaries and additives, water) with each other contribute to formation of the paper and determine the retention of the pigment. Retention is the capacity for retaining all inorganic substances in the paper during production. The surface charge of the pigment in relation to the pulp fibre plays an important role in this context.

It is known that an improvement in opacity can be achieved by special treatment of the surface of the titanium dioxide pigment.

EP 0 713 904 B1 describes a surface treatment in which a first layer of aluminium oxide phosphate is applied at an acidic pH value of 4 to 6, and a second layer of aluminium oxide is precipitated in a pH range from 3 to 10, preferably at roughly pH 7. An improvement in retention is achieved by a third layer consisting of magnesium oxide, the result being that the pigment produced is characterised by consecutive layers of aluminium oxide phosphate, aluminium oxide and magnesium oxide.

US 2004/0025749 A discloses a method for the surface treatment of a titanium dioxide pigment, in which a component containing phosphorus, titanium and aluminium is applied first by precipitation, followed by a magnesium component at a pH value of 8 to 10. These pigments are said to display improved light-fastness and high opacity.

US 2005/0011408 A describes a method for the surface treatment of a titanium dioxide pigment, in which an aluminium component and a phosphorus component are added to the TiO₂ surface treatment suspension at a pH value of at least 10 and subsequently precipitated at a pH value below 9. The method is said to lead to improved retention and unchanged opacity.

U.S. Pat. No. 6,200,375 discloses a weather-resistant titanium dioxide pigment for outdoor coatings, where the surface of the particles displays consecutive layers of zirconium hydroxide, titanium hydroxide, phosphate/silicon oxide and hydrous aluminium oxide.

SUMMARY OF THE INVENTION

The object of the invention is to provide a titanium dioxide pigment for use in decorative laminating papers that has higher opacity compared to the prior art. The object of the invention is additionally to provide a method for manufacturing a titanium dioxide pigment of this kind.

The object is solved by a titanium dioxide pigment comprising coated core particles of rutile titanium dioxide, where the coating contains aluminium phosphate, aluminium oxide, titanium oxide and silicon oxide, whereby the specific surface area to BET of the coated particles is at least 15 $m^2/g$.

The object is furthermore solved by a method for manufacturing a coated titanium dioxide pigment, comprising the steps a) Provision of an aqueous suspension of uncoated titanium dioxide core particles, b) Addition of an aluminium component and a phosphorus component, c) Addition of an alkaline silicon component and at least one pH-regulating component, where one of the pH-regulating components is an acid-reacting titanium component and where the pH of the suspension is set to a value in the range from 4 to 9.

Further advantageous versions of the invention are described in the sub-claims.

Here and below, the term "oxide" is to be taken to also mean the corresponding hydrous oxides or the hydrates. All data disclosed below regarding pH value, temperature, concentration in % by weight or % by volume, etc., are to be interpreted as including all values lying in the range of the respective measuring accuracy known to the person skilled in the art. When used in the context of the present patent, the term "significant quantity" or "significant content" indicates the minimum quantity of a component, upwards of which the properties of the mixture are affected in the framework of the measuring accuracy.

DETAILED DESCRIPTION OF THE INVENTION

The titanium dioxide pigment according to the invention is preferably a rutile titanium dioxide. It is characterised in that a layer of compounds containing aluminium/phosphorus/titanium/silicon is present on the particle surface. The silicon compound is silicon oxide and/or possibly silicon titanate. The combination of a silicon and a titanium component in Step c) of the method leads to precipitation in fluffy form, this resulting in an increase in the specific surface area to BET to values of at least 15 m²/g and improved opacity. In another embodiment the BET value amounts to 20 to 60 m²/g, in yet another embodiment it amounts to 20 to 35 m²/g. The acid-reacting titanium component has an advantageous effect here.

In the method according to the invention, a layer of compounds containing aluminium/phosphorus/titanium/silicon is deposited on the titanium dioxide particle surface, referred to below as the mixed layer for simplicity. An aluminium and a phosphorus component are first added to the $TiO_2$ suspension, in which context the pH value of the suspension can be in either the acidic or the alkaline range. Thereafter, an alkaline silicon component, an acid-reacting titanium component and, optionally, at least one other pH-regulating component are added to the suspension, either separately in any order or together, whereupon the pH value is in the range from 4 to 9 and the mixed layer is deposited on the particle surface.

The surface treatment method on which the invention is based starts with an aqueous, and preferably wet-milled, $TiO_2$ suspension (Step a)). Where appropriate, wet-milling is performed in the presence of a dispersant. The surface treatment does not take place during wet-milling. The $TiO_2$ comprises uncoated $TiO_2$ particles, i.e. $TiO_2$ base material particles, produced by the sulphate process (SP) or the chloride process (CP). The base material is usually stabilised, by addition of aluminium at a rate of 0.3 to 3% by weight, calculated as $Al_2O_3$, and with an oxygen surplus of 2 to 15% in the gas phase during oxidation of the titanium tetrachloride into titanium dioxide in the CP process, and by doping with Al, Sb, Nb or Zn, for example, in the SP process. Rutile is used with preference, particularly produced by the chloride process. The surface treatment method can be performed at a temperature of under 80° C., in another embodiment at a temperature of 55 to 65° C.

The suspension in Step a) can be set to be either alkaline or acidic.

In Step b), an aluminium and a phosphorus component are added. Suitable aluminium components for the surface treatment method according to the invention are alkaline or acid-reacting, water-soluble salts, e.g. sodium aluminate, aluminium sulphate, aluminium nitrate, aluminium chloride, aluminium acetate, etc. This selection is not to be interpreted as a restriction. The aluminium component is to be added in a quantity of 1.0 to 9.0% by weight, calculated as $Al_2O_3$ and referred to the $TiO_2$ particle. In another embodiment, the aluminium component is added in a quantity of 1.5 to 4.5% by weight, calculated as $Al_2O_3$ and referred to the $TiO_2$ particle.

Suitable phosphorus components are inorganic compounds, such as alkali phosphates, ammonium phosphate, polyphosphates, phosphoric acid, etc. This selection is not to be interpreted as a restriction. Particularly suitable are disodium hydrogenphosphate or phosphoric acid. The phosphorus component is added in a concentration of 1.0 to 5.0% by weight, calculated as $P_2O_5$ and referred to the $TiO_2$ particle. In another embodiment, the phosphorus component is added in a concentration of 1.5 to 4.0% by weight, calculated as $P_2O_5$ and referred to the $TiO_2$ particle.

In Step c), an alkaline silicon component, an acid-reacting titanium component and, optionally, one or more other pH-regulating components are added, such that a pH value in the range from 4 to 9 is obtained. In another embodiment a pH value in the range from 4 to 6 is obtained. The alkaline silicon component is preferably sodium or potassium waterglass. Between 0.1 and 5.0% by weight $SiO_2$ are added, referred to the uncoated $TiO_2$ particle. In another embodiment, 1.0 to 3.0% by weight $SiO_2$ are added, referred to the uncoated $TiO_2$ particle.

The acidic titanium component can be titanium oxide chloride or titanium oxide sulphate. Between 0.1 and 6.0% by weight of the titanium component are added, calculated as $TiO_2$ and referred to the uncoated $TiO_2$ particle.

The pH-regulating component used can be an acid or a lye. Examples of the acid that can be used are sulphuric acid, hydrochloric acid, phosphoric acid or another suitable acid. Moreover, a corresponding, acid-reacting salt, such as aluminium sulphate, can also be used in place of the acid. Sodium hydroxide solution is preferably used as the lye. Alkaline-reacting salts are also suitable. The person skilled in the art is familiar with suitable pH-regulating compounds. The selection is thus not to be interpreted as a restriction of the invention.

It has proven advantageous to apply, in a subsequent Step d), a layer of aluminium oxide to the mixed layer in such a way that the pH value is maintained in the range from 4 to 9 by parallel addition of an alkaline and an acidic component (e.g. sodium aluminate/aluminium sulphate), or by addition of an alkaline aluminium component, such as sodium aluminate, and an acid, e.g. sulphuric acid or hydrochloric acid, or by addition of an acidic aluminium component, such as aluminium sulphate, together with a lye, e.g. NaOH. In this context, either the components can be added in such a way that the pH value remains constant at a value in the range from 4 to 9, or the components can be added in such a combination that the pH value varies within the pH value range from 4 to 9 during addition. The person skilled in the art is familiar with these procedures. Suitable for setting the pH value are, for example, lyes or acids (e.g. $NaOH/H_2SO_4$), or alkaline or acid-reacting salt solutions (e.g. sodium aluminate/aluminium sulphate). It has proven particularly advantageous to perform treatment at the pH value previously set in Step c).

As and when required, the pH value is set to roughly 6 to 7 in a final Step e), e.g. using lyes/acids (e.g. $NaOH/H_2SO_4$) or using alkaline/acidic salt solutions, such as sodium aluminate/aluminium sulphate.

The quantity of the aluminium components used in Steps c), d) and e), calculated as $Al_2O_3$, is to be added to the quantity of $Al_2O_3$ previously used in Step b). In one embodiment the sum total of the aluminium components used in Steps b) to e), calculated as $Al_2O_3$ and referred to the uncoated $TiO_2$ particle, is 1.0 to 9.0% by weight. In another embodiment, this sum is 2.0 to 8.0% by weight. In yet another embodiment, this sum is 3.0 to 6.5% by weight.

Similarly, the quantity of the phosphorus component possibly used in Steps c) and d), calculated as $P_2O_5$, is to be added to the quantity of $P_2O_5$ used in Step b). In one embodiment, the sum total of the phosphorus components used in Steps b) to d), calculated as $P_2O_5$, is ideally 1.0 to 5.0% by weight, preferably % by weight, calculated as $P_2O_5$ and referred to the uncoated $TiO_2$ particle. In another embodiment, this sum is 1.5 to 4.0% by weight.

In an alternative embodiment of the invention no significant quantities of a Zr or a Ce component are used.

As a rule, it is not necessary to subject the surface-treated pigment to a final heat treatment at temperatures>200° C.

In one embodiment of the method according to the invention, the starting point is an alkaline $TiO_2$ suspension. To this end, Step a) first involves setting the suspension to a pH value of at least 10 using suitable alkaline compounds, e.g. NaOH. If wet-milling is performed, this should ideally be done before the milling operation.

In Step b), an aluminium and a phosphorus component are then added to the suspension, each in the form of an aqueous solution. During addition of the components, the pH of the suspension is maintained at a value of at least 10. Alternatively, the pH value is maintained at least 10.5. In yet another embodiment the pH value is at least 11.

Sodium aluminate is particularly suitable as the alkaline aluminium component. If an acid-reacting compound is used, such as aluminium sulphate, the addition of which would reduce the pH value to below 10, it has proven advantageous to compensate for this effect by adding a suitable alkaline compound, such as NaOH. The person skilled in the art is familiar with suitable alkaline compounds and the quantities required for maintaining the pH at a value of at least 10. In the case of phosphorus components whose addition would reduce the pH value to below 10, it has likewise proven advantageous to compensate for this effect by adding a suitable alkaline compound, such as NaOH. The person skilled in the art is familiar with suitable alkaline compounds and the quantities required for maintaining the pH at a value of at least 10.

The Al and the P component can be added to the suspension in any order, individually one after the other, or simultaneously.

In Step c), there then follows the addition of an alkaline silicon component, the addition of an acid-reacting titanium component and, where appropriate, the optional addition of at least one other pH-regulating component, in order to set the pH to a value in the range from 4 to 9.

The silicon component, the acid-reacting titanium component and the other pH-regulating component(s) can be added either consecutively or simultaneously, and also in several stages and in any order.

In one embodiment of the invention, the alkaline silicon component is sodium or potassium waterglass, the titanium component is titanium oxide chloride and the additionally used acid-reacting component is hydrochloric acid.

In an alternative embodiment of the method according to the invention, the surface treatment according to the invention is started in the acidic pH range.

In this case, Step b) involves the addition of such aluminium and phosphorus components that the pH value of the suspension is subsequently below 4. The person skilled in the art is at liberty to already reduce the pH value in Step a) by means of a suitable acid, or to reduce the pH value to below 4 in Step b) using a suitable combination of the components, and adding an acid where appropriate. For example, the combination phosphoric acid/sodium aluminate or disodium hydrogenphosphate/aluminium sulphate is suitable. The components can be added to the suspension in any order, individually one after the other, or simultaneously.

In Step c), the alkaline silicon component like e.g. sodium or potassium waterglass, and the acid-reacting titanium component, like e.g. titanium oxide chloride, are added. The addition of a further pH-regulating component may possibly be necessary, in order to set the pH to a value in the range from 4 to 9. The components can be added in Step c) either consecutively or simultaneously, and also in several stages and in any order. Depending on the quantity, nature and order of the components added in Step c), the pH value of the suspension can briefly rise to values over 9 in the course of the individual additions.

The surface-treated $TiO_2$ pigment is separated from the suspension by filtration methods known to the person skilled in the art, and the resultant filter cake is washed in order to remove the soluble salts. To improve the light-fastness of the pigment in the laminate, a nitrate-containing compound, e.g. $KNO_3$, $NaNO_3$, $Al(NO_3)_3$, can be added to the washed filter paste in a quantity of 0.05 to 1.0% by weight, calculated as $NO_3$, before or during subsequent drying. During subsequent milling, e.g. in a steam mill, an organic compound can be added to the pigment, taken from the range customarily used in the manufacture of $TiO_2$ pigments and familiar to the person skilled in the art, such as polyalcohols (trimethylolpropane). As an alternative to addition of the nitrate-containing compounds before or during drying, such substances can also be added during milling.

Compared to the reference pigments, the pigment manufactured according to this method displays improved opacity and is optimally suited to use in decorative laminating paper. Moreover, the titanium dioxide pigment according to the invention is characterised by the fact that the position of the isoelectric point (IEP) can be set via the quantity of precipitated $TiO_2$ or $SiO_2$ in Step c) and $Al_2O_3$ in Step d). The IEP characterises the pH value of the aqueous pigment suspension at which the pigment surface charge approaches zero. The surface charge of the pigment according to the invention can thus be shifted into the positive or negative range, depending on the requirements of the paper manufacturing process.

The surface treatment method according to the invention is customarily performed in batch mode. It is, however, also possible to perform treatment continuously, in which case suitable mixing equipment, such as is familiar to the person skilled in the art, must guarantee sufficiently thorough mixing.

EXAMPLES

Examples of the invention are described below, yet these examples are not intended to restrict the scope of the invention.

Example 1

A sand-milled rutile $TiO_2$ suspension from the chloride process with a $TiO_2$ concentration of 350 g/l was set to a pH value of 10 with NaOH at 60° C. While stirring, 3.5% by weight $Al_2O_3$ were added to the suspension in the form of sodium aluminate. After stirring for 10 minutes, 2.4% by weight $P_2O_5$ were added in the form of disodium hydrogenphosphate solution. This was followed by stirring for a further 10 minutes. In the next step, the suspension was set to a pH value of 5 by adding titanium oxide chloride (corresponding to 3.0% by weight $TiO_2$) and 2.4% by weight $SiO_2$ in the form of sodium waterglass. In this context, the $SiO_2$ was added in 2 steps, each with 1.2% by weight $SiO_2$, at a pH value of 10.5 and of 7, parallel to the addition of the titanium oxide chloride. After stirring for 10 minutes, 1.9% by weight $Al_2O_3$ were subsequently added in the form of parallel addition of sodium aluminate solution and HCl, such that the pH value was maintained at 5.

After stirring for 30 minutes, the suspension was set to a pH value of approx. 5.8 with the help of an alkaline sodium aluminate solution, filtered and freed of the water-soluble salts by washing. The washed filter paste was dried in the plate drier and subsequently steam-milled. The pigment displayed a BET value of 32 m²/g, the isoelectric point being at a pH value of 5.2. During preparation of the handsheets, the zeta potential of the diluted stock suspension was set to a value of +16 mV or −12 mV by adding wet-strength agent.

Example 2

A sand-milled rutile $TiO_2$ suspension from the chloride process with a $TiO_2$ concentration of 350 g/l was set to a pH value of 10 with NaOH at 60° C. While stirring, 3.5% by weight $Al_2O_3$ were added to the suspension in the form of sodium aluminate. After stirring for 10 minutes, 2.4% by weight $P_2O_5$ were added in the form of disodium hydrogenphosphate solution. This was followed by stirring for a further 10 minutes. In the next step, the suspension was set to a pH value of 5 by adding titanium oxide chloride (corresponding to 2.8% by weight $TiO_2$). Next, 1.2% by weight $SiO_2$ were added in the form of sodium waterglass. After stirring for 10 minutes, the pH value was set to 5 with HCl. Subsequently, 1.9% by weight $Al_2O_3$ were added in the form of parallel addition of sodium aluminate solution and HCl, such that the pH value was maintained at 5.

After stirring for 30 minutes, the suspension was set to a pH value of approx. 5.8 with the help of an alkaline sodium aluminate solution, filtered and freed of the water-soluble salts by washing. The washed filter paste was dried in the plate drier and subsequently steam-milled. The pigment displayed a BET value of 26 $m^2/g$, the isoelectric point being at a pH value of 6.0. During preparation of the handsheets, the zeta potential of the diluted stock suspension was set to a value of +18 mV or −14 mV by adding wet-strength agent.

Example 3

Same as Example 2, but the sodium waterglass (corresponding to 2.4% by weight $SiO_2$) was added to the suspension before the titanium oxide chloride solution (corresponding to 3.0% by weight $TiO_2$).

The pigment displayed a BET value of 30 $m^2/g$, the isoelectric point being at a pH value of 5.9. During preparation of the handsheets, the zeta potential of the diluted stock suspension was set to a value of +12 mV or −16 mV by adding wet-strength agent.

Example 4

Same as Example 3, but 1.2% by weight $SiO_2$ and 2.9% by weight $TiO_2$ were used.

The pigment displayed a BET value of 27 $m^2/g$, the isoelectric point being at a pH value of 6.2.

Example 5

Same as Example 3, but 0.6% by weight $SiO_2$ and 2.9% by weight $TiO_2$ were used.

The pigment displayed a BET value of 26 $m^2/g$, the isoelectric point being at a pH value of 6.4.

Comparative Example 1

A sand-milled rutile $TiO_2$ suspension from the chloride process with a $TiO_2$ concentration of 350 g/l was set to a pH value of 10 with NaOH at 60° C. While stirring, 2.0% by weight $Al_2O_3$ were added to the suspension in the form of sodium aluminate solution. After stirring for 10 minutes, 2.4% by weight $P_2O_5$ were added to the suspension in the form of disodium hydrogenphosphate solution. Stirring for 10 minutes then followed. In the next step, the suspension was set to a pH value of 5 by adding aluminium sulphate solution (corresponding to 2.6% by weight $Al_2O_3$). Subsequently, 0.8% by weight $Al_2O_3$ was added in the form of parallel addition of aluminium sulphate and sodium aluminate, such that the pH value was maintained at 5.

After stirring for 30 minutes, the acidic suspension was set to a pH value of approx. 5.8 with the help of an alkaline sodium aluminate solution, filtered and freed of the water-soluble salts by washing. The washed filter paste was dried in a plate drier and subsequently steam-milled.

The pigment displayed a BET value of 12 $m^2/g$.

During preparation of the handsheets, the zeta potential of the diluted stock suspension was set to a value of +16 mV in each case by adding wet-strength agent. Setting a negative zeta potential resulted in insufficient wet strength of the paper.

Comparative Example 2

A sand-milled rutile $TiO_2$ suspension from the chloride process with a $TiO_2$ concentration of 350 g/l was set to a pH value of 10 with NaOH at 60° C. While stirring, 2.0% by weight $Al_2O_3$ were added to the suspension in the form of sodium aluminate solution. After stirring for 10 minutes, 2.4% by weight $P_2O_5$ were added to the suspension in the form of disodium hydrogenphosphate solution. Stirring for 10 minutes then followed. 1.0% by weight $SiO_2$ on the form of sodium waterglass was added to the suspension. In the next step, the suspension was set to a pH value of 5 by adding aluminium sulphate (corresponding to 2.7% by weight $Al_2O_3$). Subsequently, 0.8% by weight $Al_2O_3$ was added in the form of parallel addition of aluminium sulphate and sodium aluminate, such that the pH value was maintained at 5.

After stirring for 30 minutes, the acidic suspension was set to a pH value of approx. 5.8 with the help of an alkaline sodium aluminate solution, filtered and freed of the water-soluble salts by washing. The washed filter paste was dried in a plate drier and subsequently steam-milled. The pigment displayed a BET value of 12 $m^2/g$.

Test Methods and Test Results

Test Methods

For assessing the optical properties of the decorative laminating papers, and thus the quality of the titanium dioxide pigment, it is important to compare decorative laminating papers with an identical ash content. Sheets of decorative laminating paper with a sheet weight of roughly 80 $g/m^2$ and an ash content of roughly 30 $g/m^2$ were produced.

The sheets of decorative laminating paper were produced by two different methods in parallel. In the "one-step method", the pigment to be tested was simultaneously dispersed with pulp and commercially available wet-strength agent in water to produce the sheets. This was followed by the sheet-forming operation. The person skilled in the art is familiar with the procedure. Wet-strength agent was added until the zeta potential of the diluted stock suspension, measured with a Mütek SZP 06 system zeta potential measuring instrument, was in the range from +10 mV to +20 mV.

In the "split method", the pulp and a previously determined quantity of wet-strength agent were first beaten in water. Only after a retention time was the pigment to be tested added and dispersed. This was followed by the sheet-forming operation. The person skilled in the art is familiar with the procedure.

The necessary quantity of wet-strength agent was determined in a separate test with the help of the zeta potential of the diluted stock suspension. A given quantity of pulp and titanium dioxide pigment was beaten in water to this end. Wet-strength agent was subsequently added until the zeta potential of the diluted stock suspension was in the range from −10 mV to −20 mV. The quantity of wet-strength agent used for both methods was of the customary order of magnitude of 1 to 4% by weight wet-strength agent (active substance), referred to pulp (oven-dry).

The titanium dioxide content (ash) of a sheet and the pigment retention were subsequently determined.

a) Ash Content

The titanium dioxide content was determined by incinerating a defined weight of the produced paper in a rapid incinerator at 900° C. The $TiO_2$ content by mass (ash) in % by weight was obtained by weighing the residue. The following formula was used as the basis for calculating the ash content:

Ash content[g/m$^2$]=(Ash[% by weight]×Grammage[g/m$^2$])/100[%].

b) Optical Properties

The optical properties of the pigments were determined in laminates.

To this end, the decorative laminating paper was impregnated with a modified melamine impregnating resin and pressed into laminates. The sheet to be impregnated with resin was completely immersed in the melamine resin solution, subsequently drawn between 2 doctor blades to ensure application of a specific amount of resin and then immediately pre-condensed at 130° C. in a recirculating-air drying oven. The amount of resin applied was 120 to 140% of the weight of the sheet. The sheet had a residual moisture content of approx. 6% by weight. The condensed sheets were combined into books with phenolic resin-impregnated core papers and white/black underlay paper.

The laminate structure used for assessing the test pigments comprised 11 layers: decorative laminating paper, white/black underlay, core paper, core paper, core paper, white underlay, core paper, core paper, core paper, white/black underlay, decorative laminating paper.

The books were pressed for 300 seconds with the help of a Wickert Type 2742 laminating press at a temperature of 140° C. and a pressure of 900 N/cm$^2$.

The optical properties of the laminates were measured using a commercially available spectrophotometer.

In order to assess the optical properties of the laminates, the optical values of the decorative laminating papers (CIELAB L*, a*, b*) to DIN 6174 were determined with the help of the ELREPHO® 3000 colorimeter over white and black underlay. The opacity is a measure of the light transmission of the paper. The following parameters were selected as a measure of the opacity of the laminates: CIELAB L*$_{black}$, the brightness of the laminates measured over black underlay paper, and the opacity value L[%]=Y$_{black}$/Y$_{white}$×100, determined from the Y-value of the decorative laminating papers measured over black underlay paper (Y$_{black}$) and the Y-value measured over white underlay paper (Y$_{white}$).

c) Specific Surface Area to BET (Brunauer-Emmett-Teller)

The BET surface was measured according to the static volumetric principle, using a Tristar 3000 from Micromeritics.

d) Isoelectric Point

The measuring method is based on determination of the electrophoretic mobility of the pigment particles in an electrolyte solution upon application of an electrical field. The pigment to be tested was dispersed in 0.01 M aqueous KCl solution. The profile of the zeta potential of the specimen as a function of the pH value was subsequently determined using a Zetasizer 3000 HSA from Malvern. The isoelectric point characterises the pH value at which the zeta potential is zero.

Test results

| Pigment | BET [m$^2$/g] | Opacity (+) L*$_{black}$ | L [%] | Opacity (−) L*$_{black}$ | L [%] |
|---|---|---|---|---|---|
| Example 1 | 32 | 90.7 | 91.9 | 90.8 | 92.2 |
| Example 2 | 26 | 90.4 | 91.5 | 90.8 | 92.3 |
| Example 3 | 30 | 90.5 | 91.6 | 90.9 | 92.2 |
| Comp. Ex. 1 | 12 | 90.2 | 91.0 | — | — |
| Comp. Ex. 2 | 12 | 90.3 | 91.0 | n.d. | n.d. |

(+) Zeta potential of the diluted stock suspension set to a positive value
(−) Zeta potential of the diluted stock suspension set to a negative value
— Sufficient wet-strength of the paper not achievable
n.d. not determined Example pigments 1, 2 and 3 according to the invention demonstrate improved opacity and higher BET values compared to the comparative example pigments 1 and 2.

Example pigments 1 and 2, or 3, 4 and 5, moreover demonstrate that an increasing $SiO_2$ content in the coating shifts the isoelectric point (IEP) towards lower pH values. In contrast to the comparative example pigment 1, both a positive and a negative zeta potential can be set when using the example pigments and adding customary quantities of wet-strength agent.

Obviously, many modifications and variations of the present invention are possible in light of the above teachings. It is therefore to be understood that, within the scope of the appended claims, the invention may be practiced otherwise than as specifically described. All of the above identified US provisional applications, patents, and reference material, including references contained therein, are hereby incorporated herein by reference in their entirety.

We claim:

1. Titanium dioxide ($TiO_2$) pigment particles, comprising:
   a) uncoated rutile $TiO_2$ particles;
   b) a coating covering the uncoated rutile $TiO_2$ particles, the coating containing aluminum phosphate, aluminum oxide, silicon oxide, and titanium oxide, and where the specific surface area to BET of the coated particles is at least 15 m$^2$/g.

2. The $TiO_2$ pigment particles of claim 1, wherein the aluminum content of the coating is 1.0 to 9.0% by weight calculated as $Al_2O_3$.

3. The $TiO_2$ pigment particles of claim 2, wherein the aluminum content of the coating is 2.0 to 8.0% by weight calculated as $Al_2O_3$.

4. The $TiO_2$ pigment particles of claim 1, wherein the phosphorous content of the coating is 1.0 to 5.0% by weight calculated as $P_2O_5$.

5. The $TiO_2$ pigment particles of claim 4, wherein the phosphorous content of the coating is 1.5 to 4.0% by weight calculated as $P_2O_5$.

6. The $TiO_2$ pigment particles of claim 1, wherein the silicon content of the coating is 0.1 to 5.0% by weight calculated as $SiO_2$.

7. The $TiO_2$ pigment particles of claim 6, wherein the silicon content of the coating is 1.0 to 3.0% by weight, calculated as $SiO_2$.

8. The $TiO_2$ pigment particles of claim 1, wherein the titanium content of the coating is 0.1 to 6.0% by weight, calculated as $TiO_2$.

9. The $TiO_2$ pigment particles of claim 1, wherein the specific surface area to BET is 20 to 60 m$^2$/g.

10. The $TiO_2$ pigment particles of claim 9, wherein the specific surface area to BET is 20 to 35 m$^2$/g.

11. The $TiO_2$ pigment particles of claim 1, wherein the $TiO_2$ pigment particles are contained in decorative laminating paper.

12. The $TiO_2$ pigment particles of claim 11, wherein decorative laminating paper is laminated.

13. A method for manufacturing $TiO_2$ pigment particles, comprising the steps:
   a) providing an aqueous suspension of uncoated rutile $TiO_2$ particles;
   b) adding an aluminum component and a phosphorous component to the aqueous suspension;
   c) adding at least one pH-regulating component and an alkaline silicon component to the aqueous suspension of step b) where one of the pH-regulating components is an acid-reacting titanium component and where the pH of the suspension is set to a value in the range from 4 to 9.

14. The method of claim 13, wherein the pH of the suspension is maintained at a value of at least 10 during step b).

15. The method of claim 13, further comprising;
   d) adding an aluminum component and a pH-regulating component, while maintaining the pH value of the suspension in the range from 4 to 9, thereby adding an aluminum oxide layer to the pigment particles produced in step c).

16. The method of claim 15, further comprising;
   e) setting the final pH value of the suspension roughly 6 to 7 using a lye or acid solution, or with an alkaline or acidic salt solution.

17. The method of claim 15, further comprising;
   e) treating the pigment with nitrate, wherein the finished pigment contains 0.05 to 1.0% by weight $NO_3$.

18. The method of claim 17, further comprising;
   f) milling the pigment particles with organic compound.

19. The method of claim 15, further comprising;
   e) adding the pigment particles to a process for manufacturing decorative laminating paper.

20. The method of claim 15, further comprising;
   e) milling the pigment particles with an organic compound.

21. The method of claim 13, wherein the sum total of the aluminum components added after step a) is 1.0 to 9.0% by weight calculated as $Al_2O_3$.

22. The method of claim 21, wherein the sum total of the aluminum components added after step a) is 2.0 to 8.0% by weight calculated as $Al_2O_3$.

23. The method of claim 13, wherein the sum total of the phosphorus components added after step a) is 1.0 to 5.0% by weight calculated as $P_2O_5$.

24. The method of claim 23, wherein the sum total of the phosphorus components added after step a) is 1.5 to 4.0% by weight calculated as $P_2O_5$.

25. The method of claim 13, wherein the sum total of the silicon components added after step b) is 0.1 to 5.0% by weight, calculated as $SiO_2$.

26. The method of claim 25, wherein the sum total of the silicon components added after step b) is 1.0 to 3.0% by weight, calculated as $SiO_2$.

27. The method of claim 13, wherein the sum total of the titanium components added after step b) is 0.1 to 6.0% by weight, calculated as $TiO_2$.

28. The method of claim 13, further comprising;
   d) adding the pigment particles to a process for manufacturing decorative laminating paper.

29. The method of claim 28, further comprising;
   e) laminating the decorative laminating paper.

30. Titanium dioxide ($TiO_2$) pigment particles, comprising:
   a) uncoated rutile $TiO_2$ particles;
   b) a single layer uniform coating covering the uncoated rutile $TiO_2$ particles, the single layer uniform coating containing aluminum phosphate, aluminum oxide, silicon oxide, and titanium oxide.

31. The titanium dioxide ($TiO_2$) pigment particles of claim 30 wherein the specific surface area to BET of the coated particles is at least 15 $m^2/g$.

* * * * *